(12) United States Patent
Shimizu

(10) Patent No.: US 8,460,088 B1
(45) Date of Patent: Jun. 11, 2013

(54) GAME PROCESSING SERVER APPARATUS

(71) Applicant: DeNA Co., Ltd., Tokyo (JP)

(72) Inventor: Yuji Shimizu, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/746,682

(22) Filed: Jan. 22, 2013

(30) Foreign Application Priority Data

Apr. 27, 2012 (JP) ................................ 2012-103454

(51) Int. Cl.
*G07F 17/32* (2006.01)

(52) U.S. Cl.
USPC ................... 463/20; 463/16; 463/25; 463/29

(58) Field of Classification Search
USPC .................... 463/16, 20, 25, 29, 42
See application file for complete search history.

(56) References Cited

U.S. PATENT DOCUMENTS

2004/0242303 A1* 12/2004 Walker et al. .................. 463/16

* cited by examiner

*Primary Examiner* — Omkar Deodhar
(74) *Attorney, Agent, or Firm* — IPUSA, PLLC

(57) ABSTRACT

A game processing server apparatus connected to a terminal device via a network and controlling a game in which a reward is given by completing a collection of predetermined items, includes a parameter updating unit which receives an instruction to send an item from a first player to a second player, and calculates and updates a bonding parameter indicating intimacy from the first player toward the second player; and a display unit which displays in a screen for a target player a value of a first bonding parameter indicating intimacy from the target player toward another player and a value of a second bonding parameter indicating intimacy from the other player toward the target player.

5 Claims, 23 Drawing Sheets

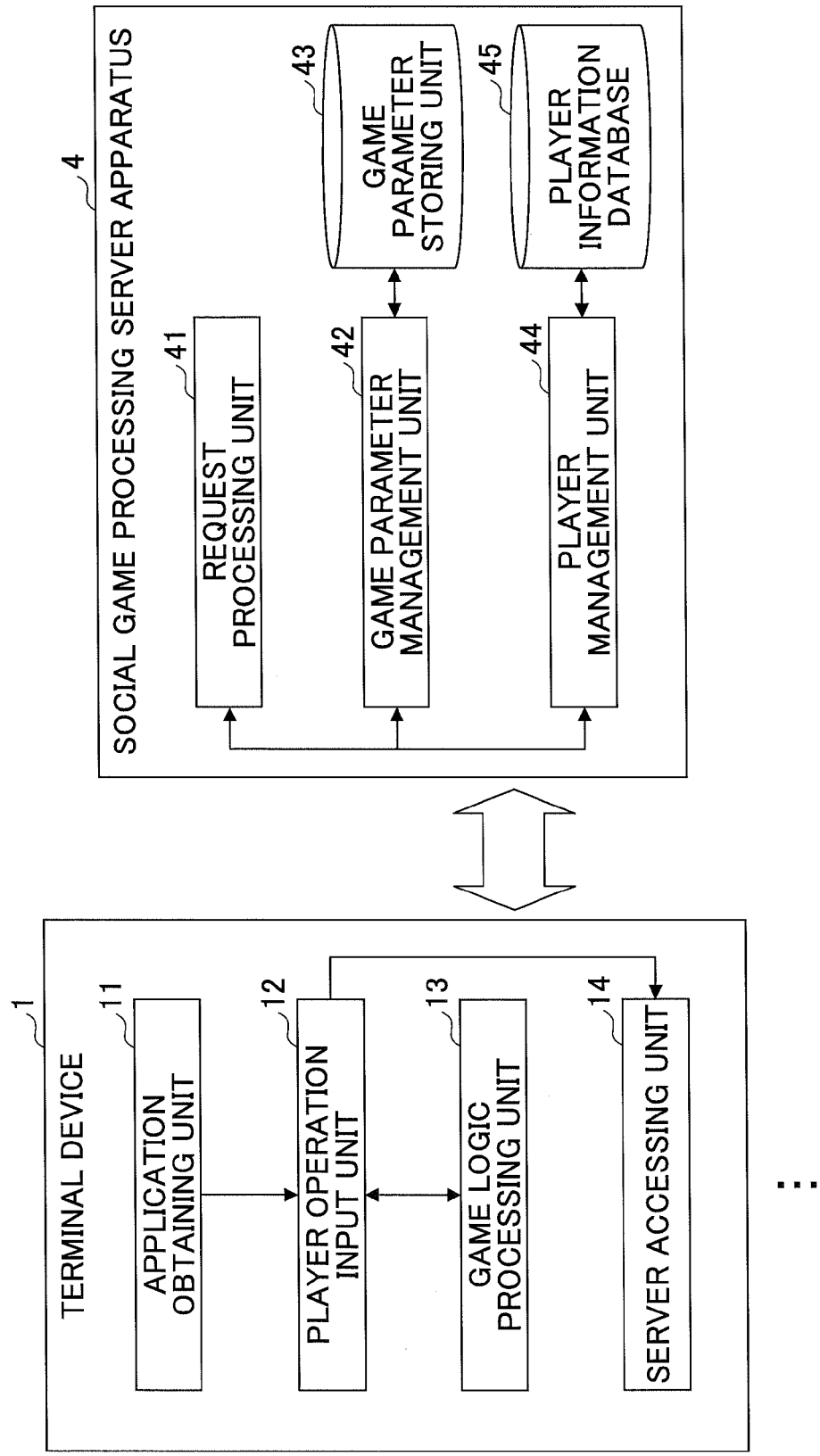

FIG.5

| PLAYER ID | STATUS | ICON DATA | PLAYER NAME | FRIEND PLAYER ID | ATTRIBUTE | OBTAINED NORMAL SCROLL | READ NORMAL SCROLL | OBTAINED RARE SCROLL | READ RARE SCROLL | BONDING PARAMETER DATA | LETTER DATA | | | |
|---|---|---|---|---|---|---|---|---|---|---|---|---|---|---|
| 1 | 16 | ICON DATA #1 | aaa | 5, 8 | TIGER | A, D | A, D | F | — | BONDING PARAMETER DATA #1 | — | : | : | : |
| 2 | 1 | ICON DATA #2 | bbb | NONE | CROW | B, C, D | B, D | — | — | BONDING PARAMETER DATA #2 | ○○○·· ··· | : | : | : |
| 3 | 53 | ICON DATA #3 | ccc | 4, 6 | SHARK | A, B, C, D, E | A, B, C, D | F, G, H | F, G, H | BONDING PARAMETER DATA #3 | ONE-WAY INTIMACY ESTABLISHED ··· | : | : | : |
| 4 | 24 | ICON DATA #4 | ddd | 3, 6 | TIGER | D | D | G, I | G, I | BONDING PARAMETER DATA #4 | — | : | : | : |
| 5 | 31 | ICON DATA #5 | eee | 1, 6 | CROW | — | — | F, J | J | BONDING PARAMETER DATA #5 | — | : | : | : |
| 6 | 67 | ICON DATA #6 | fff | 3, 4, 5 | SHARK | A, B, C, D, E | A, B, C, D, E | F, G, H, I, J | F, G, H, I, J | BONDING PARAMETER DATA #6 | TWO-WAY INTIMACY ESTABLISHED ··· | : | : | : |
| : | : | : | : | : | : | : | : | : | : | : | : | | | |
| : | : | : | : | : | : | : | : | : | : | : | : | | | |
| : | : | : | : | : | : | : | : | : | : | : | : | | | |

FIG.6

| FRIEND PLAYER ID | INTIMACY PARAMETER OF PLAYER (N) | INTIMACY PARAMETER OF FRIEND PLAYER | TIMES OF TWO-WAY INTIMACY ESTABLISHED |
|---|---|---|---|
| 7 | 0 | 30 | 0 |
| 9 | 20 | 100 | 3 |
| 12 | 30 | 0 | 2 |
| 14 | 100 | 80 | 0 |
| 17 | 80 | 50 | 1 |
| 21 | 25 | 90 | 4 |
| .. | .. | .. | .. |
| .. | .. | .. | .. |
| .. | .. | .. | .. |

FIG.7

| ATTRIBUTE | TIGER | CROW | SHARK |
|---|---|---|---|
| SCROLL A | 40% | 0% | 14% |
| SCROLL B | 0% | 40% | 14% |
| SCROLL C | 40% | 5% | 9% |
| SCROLL D | 5% | 5% | 44% |
| SCROLL E | 5% | 40% | 9% |
| SCROLL F | 1% | 1% | 4% |
| SCROLL G | 1% | 4% | 1% |
| SCROLL H | 4% | 1% | 1% |
| SCROLL I | 2% | 4% | 0% |
| SCROLL J | 2% | 0% | 4% |
| TOTAL | 100% | 100% | 100% |

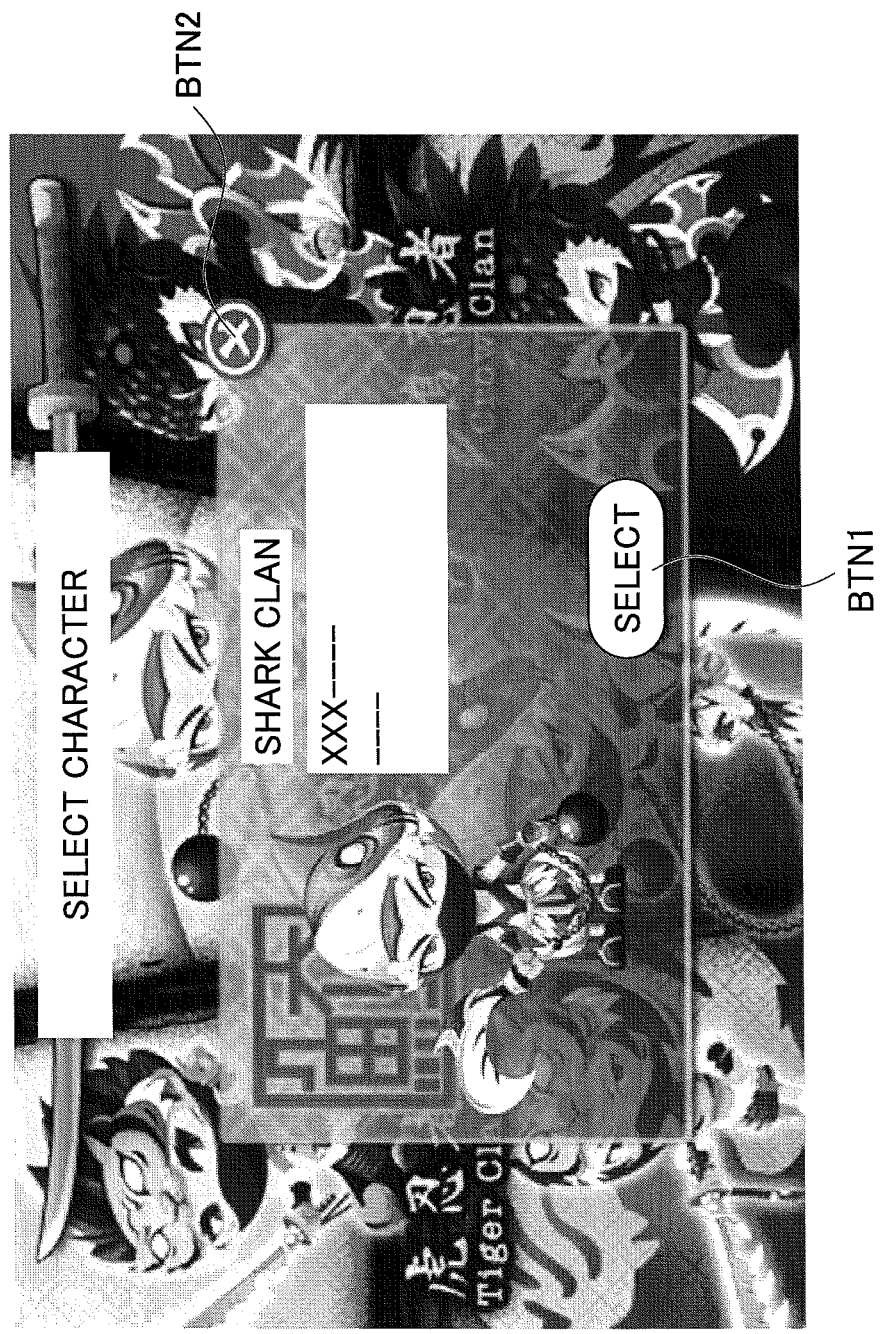

BTN3

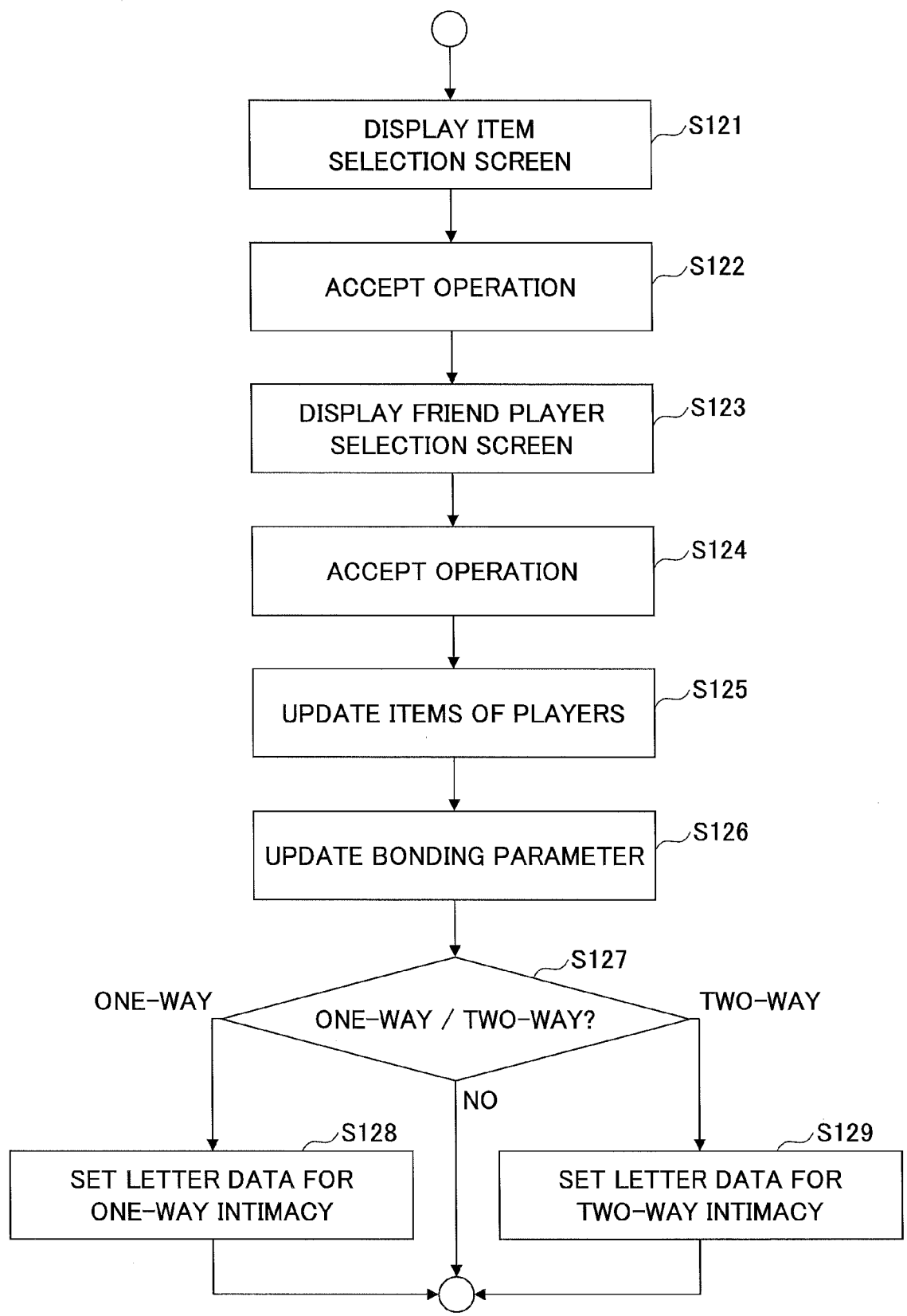

GAME PROCESSING SERVER APPARATUS

BACKGROUND OF THE INVENTION

1. Field of the Invention

The present invention relates to a game processing server apparatus.

2. Description of the Related Art

A game in which a player can get a new item or a reward when the player completes collecting predetermined plural items is known.

Further, a mechanism in which a player is given an item which is not obtained yet from another player, or the player gives an item to the other player so that the players can cooperatively collect items is provided in order to activate communications in a social game.

As described above, the mechanism in which the players give and are given items (exchange items) with each other is important in the social game. The player may think about giving an obtained item to another player who has contributed to collecting the items for the player as a return gift. However, it is hard for the player to recognize which player and how much the other player has contributed to collecting the items for the player.

Thus, although the player can know that the other player has given an item by a notice, it is difficult for the player to remember who and what item the other player has given to the original player. Further, as the values of the items are defined by an operator (developer) of the game it is difficult for the players to know contributions of other players to collecting the items.

SUMMARY OF THE INVENTION

The present invention is made in light of the above problems, and provides a game processing technique capable of promoting communications between players in which the players send items to each other, the players cooperate with each other, and the players have deep friendship with each other to increase motivation to play the game.

According to an embodiment, there is provided a game processing server apparatus connected to a terminal device via a network and controlling a game in which a reward is given by completing a collection of predetermined items, including a parameter updating unit which receives an instruction to send an item from a first player to a second player, and calculates and updates a bonding parameter indicating intimacy from the first player toward the second player; and a display unit which displays in a screen for a target player a value of a first bonding parameter indicating intimacy from the target player toward another player and a value of a second bonding parameter indicating intimacy from the other player toward the target player.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a block diagram showing an example of a functional structure of the terminal device and the social game processing server apparatus;

FIG. 5 is a view showing an example of a data structure of player information stored in a player information database;

FIG. 6 is a view showing an example of a data structure of bonding parameter data;

FIG. 7 is a view showing an example of probabilities of candidate items appearing in a mission included in game parameter data;

FIG. 9B is a view showing an example of an attribute selection confirmation screen;

FIG. 14 is a flowchart showing an operation of the embodiment;

DETAILED DESCRIPTION OF THE PREFERRED EMBODIMENTS

Figure 1:
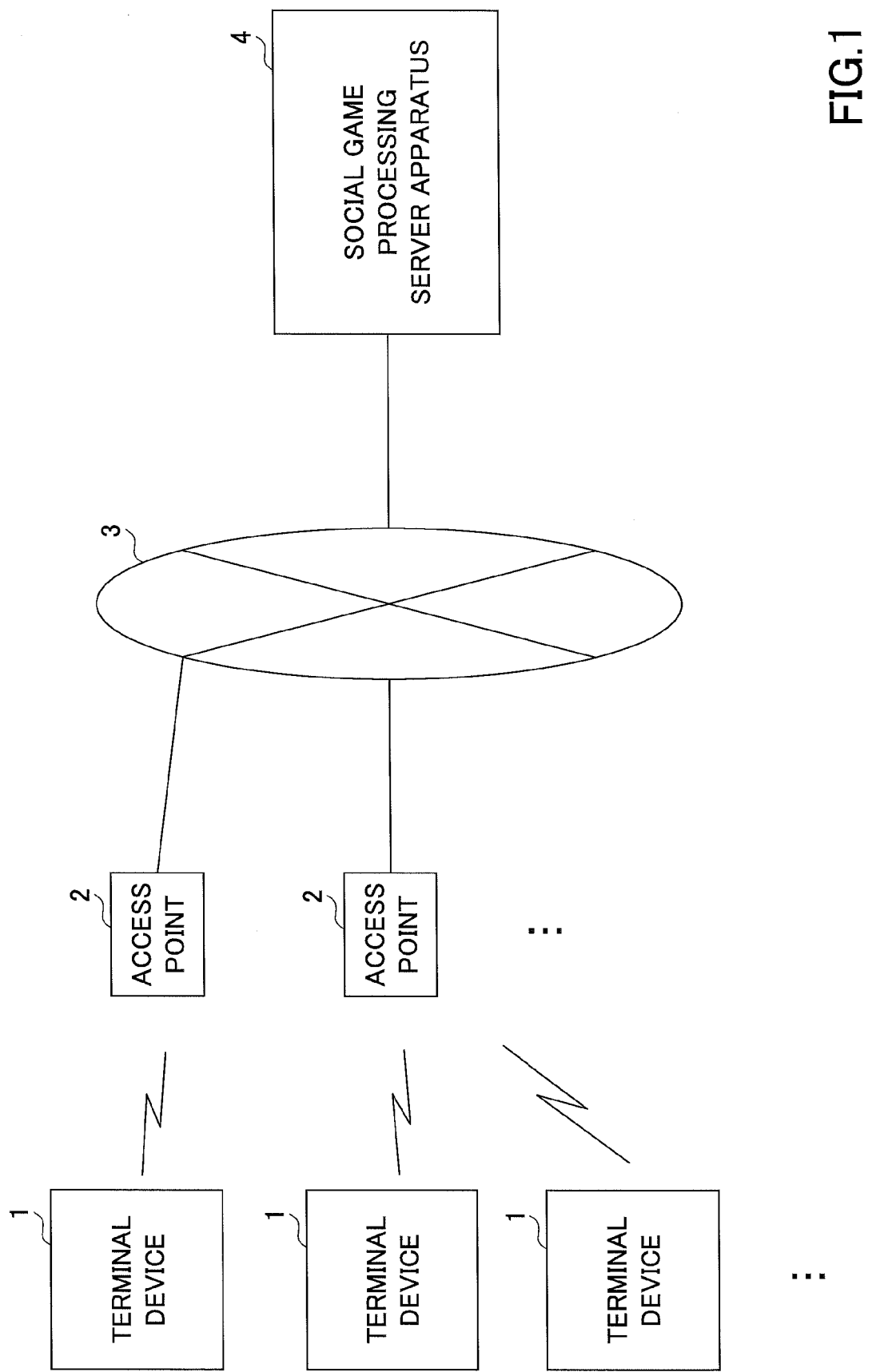
FIG. 1 is a block diagram showing a structure of an example of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

FIG. 1 is a block diagram showing a structure of an example of a system of the embodiment.

The system shown in FIG. 1 includes plural terminal devices 1 which belong to players (users), respectively, access points 2 such as a mobile base station, a Wi-Fi station or the like, a network 3 such as the INTERNET or the like, and a social game processing server apparatus 4. The social game processing server apparatus 4 controls processing of a social game (social network game) in which plural players play a game via the network 3. The terminal device 1 may be a smart phone, a mobile phone, or the like.

Figure 2:
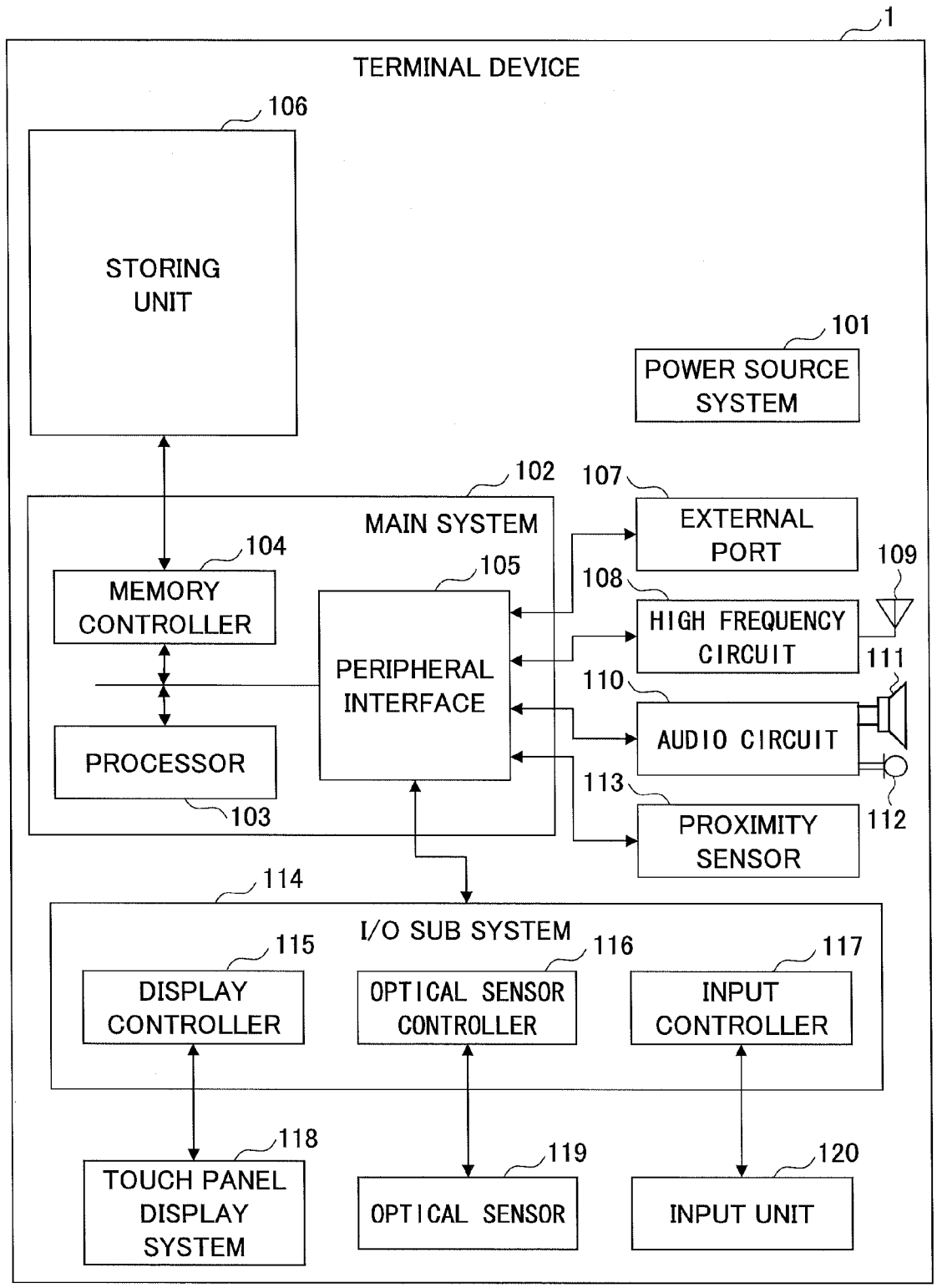
FIG. 2 is a block diagram showing an example of a hardware structure of a terminal device.

FIG. 2 is a block diagram showing an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116, and an input controller 117.

Figure 3:
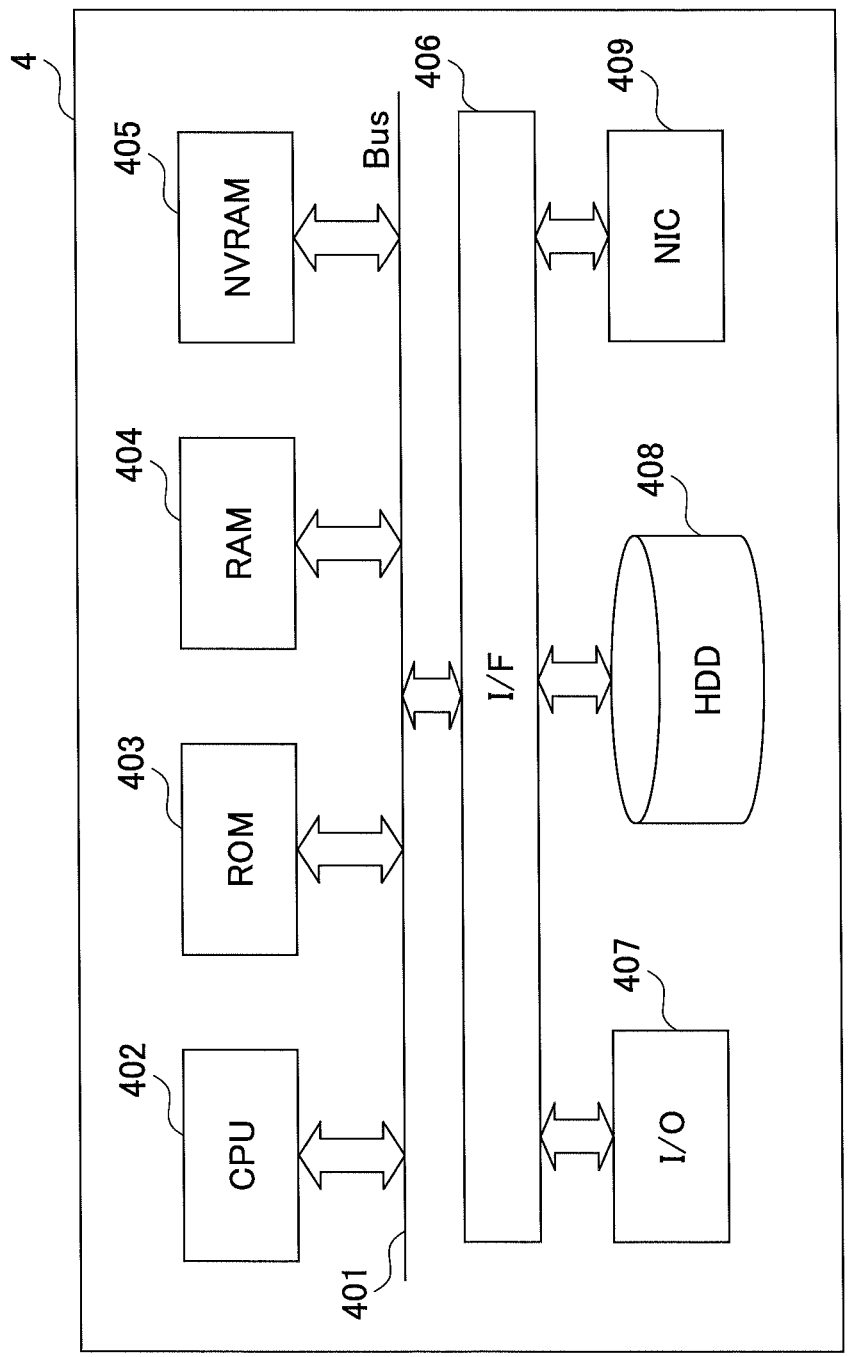
FIG. 3 is a block diagram showing an example of a hardware structure of a social game processing server apparatus.

FIG. 3 is a block diagram showing an example of a hardware structure of the social game processing server apparatus 4.

The social game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

FIG. 4 is a block diagram showing an example of a functional structure of the terminal device 1 and the social game processing server apparatus 4.

In FIG. 4, the terminal device 1 includes a player operation input unit 11, a game logic processing unit 12, a server accessing unit 13, and a screen display unit 14.

The player operation input unit 11 has a function to input (accept) an operation of a player (user) of the terminal device 1.

The game logic processing unit 12 has a function to process a game by transitioning screens based on screen transition information in accordance with the input operation by the player via the player operation input unit 11.

The server accessing unit 13 has a function to send a request to the social game processing server apparatus 4 when it is necessary to access the social game processing server apparatus 4 in a course of the processing of the game logic processing unit 12. Further, the server accessing unit 13 has a function to receive a processed result, screen transition information and the like as a response from the social game processing server apparatus 4. Here, the request includes a request for updating and a request for referring to data. The request for updating is a request to perform an operation including updating player information such as "give an item to another player as a gift", in which the player sends an obtained item to another player, or the like. Thus, with this operation, it is necessary to update the player information. The request for referring to data is a request to perform an operation including referring to the player information such as "referring to obtained items" or the like.

The screen display unit 14 has a function to display screens based on the screen information under control of the game logic processing unit 12.

The social game processing server apparatus 4 includes a request processing unit 41, a game parameter management unit 42, a game parameter storing unit 43, a player management unit 44, and a player information database 45.

The request processing unit 41 has a function to receive a request from the terminal device 1, perform a corresponding process and send a processed result of the request to the terminal device 1 as a response. When the request processing unit 41 receives the request for updating, the request processing unit 41 performs an operation to update the player information, and sends the player information or the like which is changed by the operation as the processed result. When the request processing unit 41 receives the request for referring to data, the request processing unit 41 refers to the player information, and sends an obtained value of the player information as the processed result.

The game parameter management unit 42 has a function to manage game parameters, which relate to operations of a game such as a probability or the like for a reward given to a player when the player clears a mission, fights against an enemy character or the like in the game, stored in the game parameter storing unit 43.

The player management unit 44 has a function to manage various information items about all of the players participating in the game, which are stored in the player information database 45. An example of the data structure of the player information is explained later in detail.

FIG. 5 is a view showing an example of a data structure of the player information stored in the player information database 45.

In FIG. 5, the player information includes items (fields) such as "player ID", "status", "icon data", "player name", "friend player ID", "attribute", "obtained normal scroll", "read normal scroll", "obtained rare scroll", "read rare scroll", "bonding parameter data", "letter data" and the like.

The "player ID" is data to specify (identify) the player. The "status" is data to specify a status of the player in the game. The "icon data" is data to specify a displayed icon of the player. The "player name" is data indicating displayed name of the player. The "friend player ID" is data to specify the other players whom the player registers as friend players. The "attribute" is data indicating a type, selected by the player at a start of the game, of the player.

The "obtained normal scroll" is data to specify a normal (not rare) scroll (item) obtained by the player or given by the other players. When the player gives the item to the other player, the player information is updated so that the item is not registered as "obtained". The "read normal scroll" is data to specify the normal scroll which is read after performing a predetermined operation among the obtained normal scrolls. The "obtained rare scroll" is data to specify a rare scroll obtained by the player or given by the other players. At this time as well, the player information is updated so that the item given to the other player is not registered as "obtained". The "read rare scroll" is data to specify the rare scroll which is read after performing a predetermined operation among the obtained rare scrolls.

The "bonding parameter data" is data indicating intimacies from one player to the other players, and intimacies from the other players to the one player. The "bonding parameter data" is explained later in detail. The "letter data" is data of a new letter to be displayed when the player enters a room screen (my room screen), or when updating of the room screen is performed.

FIG. 6 is a view showing an example of a data structure of the bonding parameter data.

In FIG. 6, bonding parameter data of a player (N) is exemplified. The bonding parameter data includes items (fields) such as "friend player ID", "intimacy parameter of player (N)", "intimacy parameter of friend player" "times of two-way intimacy" and the like.

The "friend player ID" is data to specify the other players whom the player registers as friend players. The "intimacy parameter of player (N)" is data indicating intimacy of the player (N) to the player identified by the friend player ID. The "intimacy parameter of player (N)" is calculated based on how rare and the number of items the player (N) has given (sent) to the player identified by the friend player ID. The "intimacy parameter of friend player" is data indicating intimacy of the player identified by the friend player ID to the player (N). The "intimacy parameter of friend player" is calculated based on how rare and the number of items the player identified by the friend player ID has given (sent) to the player (N).

In this embodiment, when both the values of the "intimacy parameter of player (N)" and the "intimacy parameter of friend player" become a predetermined value (for example, 100), it is assumed that a "two-way intimacy" is established between the player (N) and the player identified by the friend player ID. The "times of two-way intimacy" is data indicating the number of times the "two-way intimacy" is established. Here, when the "two-way intimacy" is established, the values of the "intimacy parameter of player (N)" and the intimacy parameter of friend player" are reset to be an initial value (0).

Although an example of the bonding parameter data in which both the "intimacy parameter of player (N)" and the "intimacy parameter of friend player" are provided for each of the players is described, the bonding parameter data may include only the "intimacy parameter of one player" for each of the other players. It is possible to obtain the "intimacy parameter of friend player" from the player (X) to the player (N) for the player (N) from the "intimacy parameter of player (X)" to the player (N) for the player (X) based on the friend player IDs of the player (N) and the player (X).

FIG. 7 is a view showing an example of probabilities of candidate items appearing in a mission included in the game parameter data stored in the game parameter storing unit 43.

In this embodiment, as described above, when starting the game, each of the players selects one of "tiger", "crow", and "shark" as an attribute (character). Then, the probabilities for scrolls (items) to appear in the mission are varied in accordance with the scrolls and the attributes.

For example, the probability to appear for the scroll "A" is 40% for the "tiger", 0% for the "crow", and 14% for the "shark". It means that the scroll "A" tends to appear more for the player whose attribute is the "tiger" than the player whose attribute is the "crow" or the "shark". Thus, the player whose attribute is the "tiger" may easily obtain the scroll "A" by himself/herself compared with the player whose attribute is the "crow" or the "shark".

On the other hand, the probability to appear for the scroll "B" is 0% for the "tiger", 40% for the "crow", and 14% for the "shark". It means that the scroll "B" tends to appear more for the player whose attribute is the "crow" than the player whose attribute is the "tiger" or the "shark". Thus, the player whose attribute is the "crow" may easily obtain the scroll "B" by himself/herself compared with the player whose attribute is the "tiger" or the "shark". With this mechanism, the players tend to have different items based on the attributes so that there exist other players who have obtained the item the player wants to obtain. This becomes a motivation for the players to make friends with each other.

(Operation)

Figure 8:
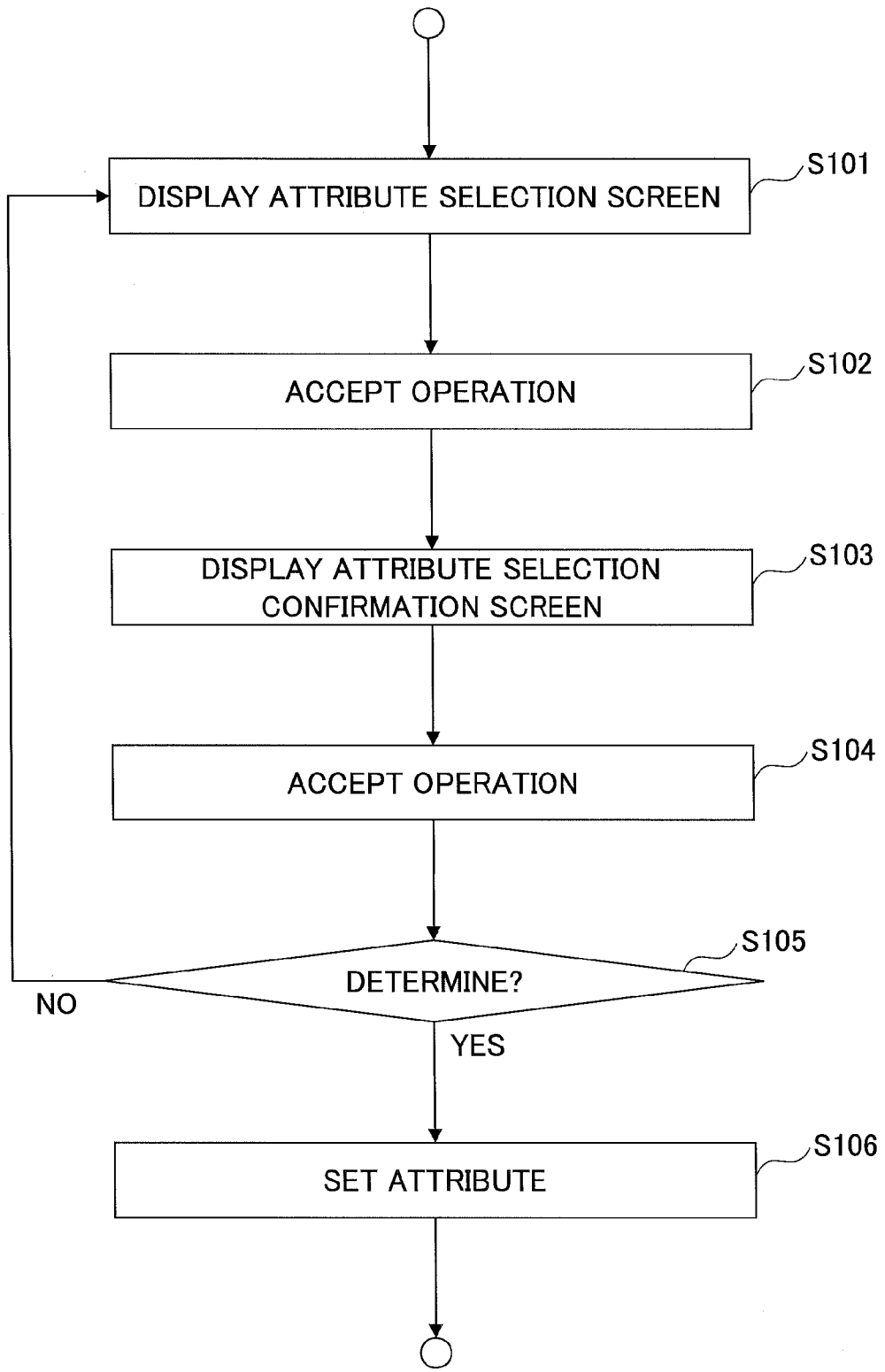
FIG. 8 is a flowchart showing an operation of the embodiment.

FIG. 8 is a flowchart showing an example of an operation when starting the game for the first time.

Figure 9A:
FIG. 9A is a view showing an example of an attribute selection screen.

In FIG. 8, the screen display unit 14 displays an attribute selection screen under control of the game logic processing unit 12 (step S101). FIG. 9A is a view showing an example of the attribute selection screen, in which attributes (characters) of a tiger (tiger clan), a shark (shark clan), and a crow (crow clan) are displayed from left side. When the player taps a desired portion (touch the screen), the attribute is tentatively selected.

Referring back to FIG. 8, when the operation of selection is accepted by the player operation input unit 11 (step S102), the screen display unit 14 displays an attribute selection confirmation screen under control of the game logic processing unit 12 (step S103). FIG. 9B is a view showing an example of the attribute selection confirmation screen. When the player taps a "SELECT" button BTN1, the selection of the attribute is determined, and when the player taps an "X" button BTN2, the selection of the attribute is canceled.

Referring back to FIG. 8, when the operation of determination or cancellation is accepted by the player operation input unit 11 (step S104), and when it is the operation of cancellation (NO of step S105) the process goes back to step S101 and the attribute selection screen is displayed again.

When the selection is determined (YES of step S105), the server accessing unit 13 sends a result of the selection of the attribute to the social game processing server apparatus 4 under control of the game logic processing unit 12. Then, the request processing unit 41 of the social game processing server apparatus 4 sets the attribute of the respective player in the player information database 45 via the player management unit 44 (step S106).

Figure 10:
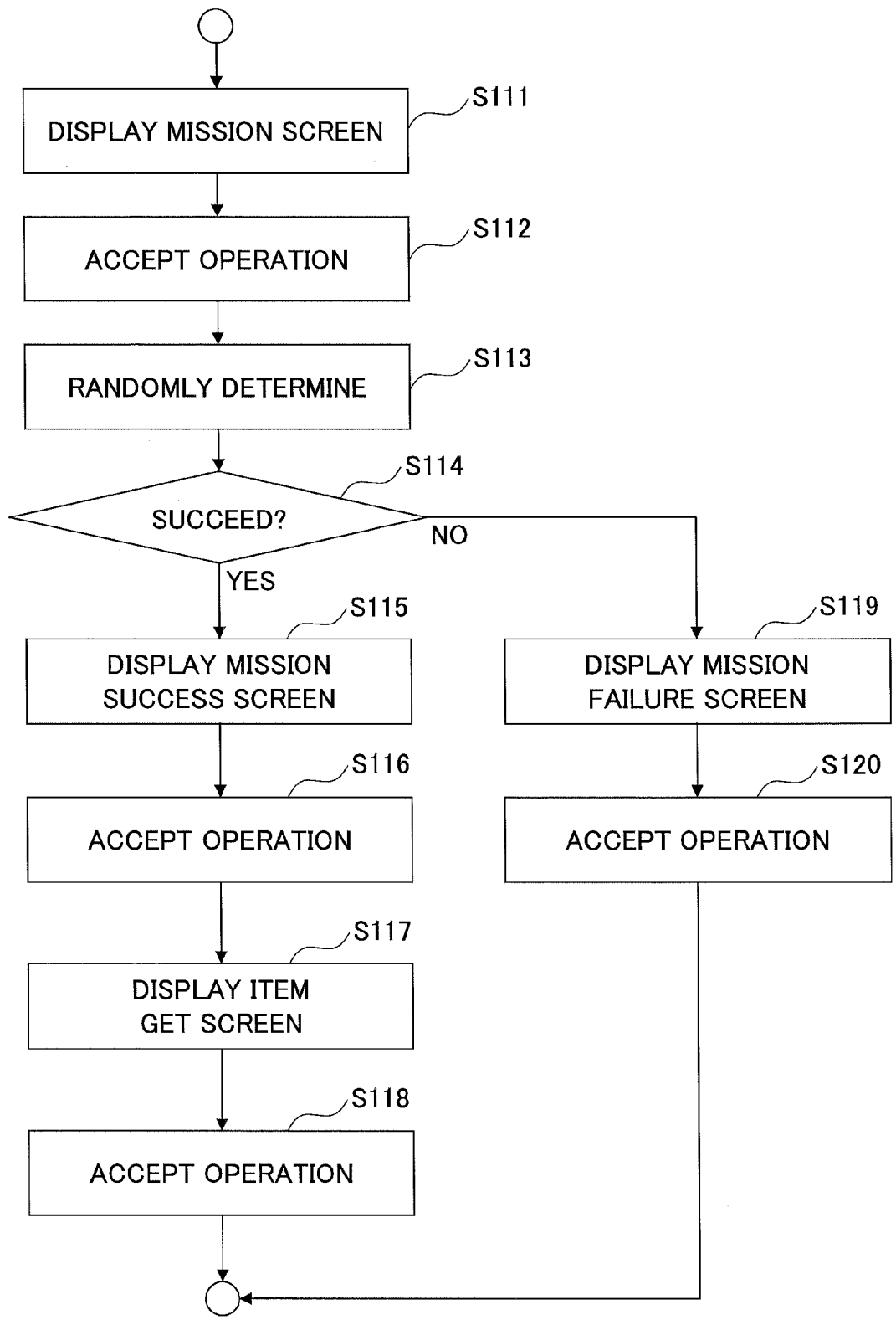
FIG. 10 is a flowchart showing an operation of the embodiment.

FIG. 10 is a flowchart showing an operation when a mission is executed.

Figure 11:
FIG. 11 is a view showing an example of a mission screen.

In FIG. 10, the screen display unit 14 displays a mission screen under control of the game logic processing unit 12 (step S111). FIG. 11 is a view showing an example of the mission screen, in which a "GO" button BTN3 is displayed at a right lower side. When the player taps the "GO" button BTN3, the mission starts.

Referring back to FIG. 10, when the operation to start the mission is accepted by the player operation input unit 11 (step S112), the server accessing unit 13 sends a fact that the mission is started to the social game processing server apparatus 4 under control of the game logic processing unit 12. Then, the request processing unit 41 of the social game processing server apparatus 4 randomly determines whether the mission succeeds and either of the items (the scrolls) can be obtained based on the probability to appear as shown in FIG. 7 and sends the determined result to the terminal device 1. When the determined result is that the mission succeeds, the obtained item is also sent (step S113).

Figure 12A:
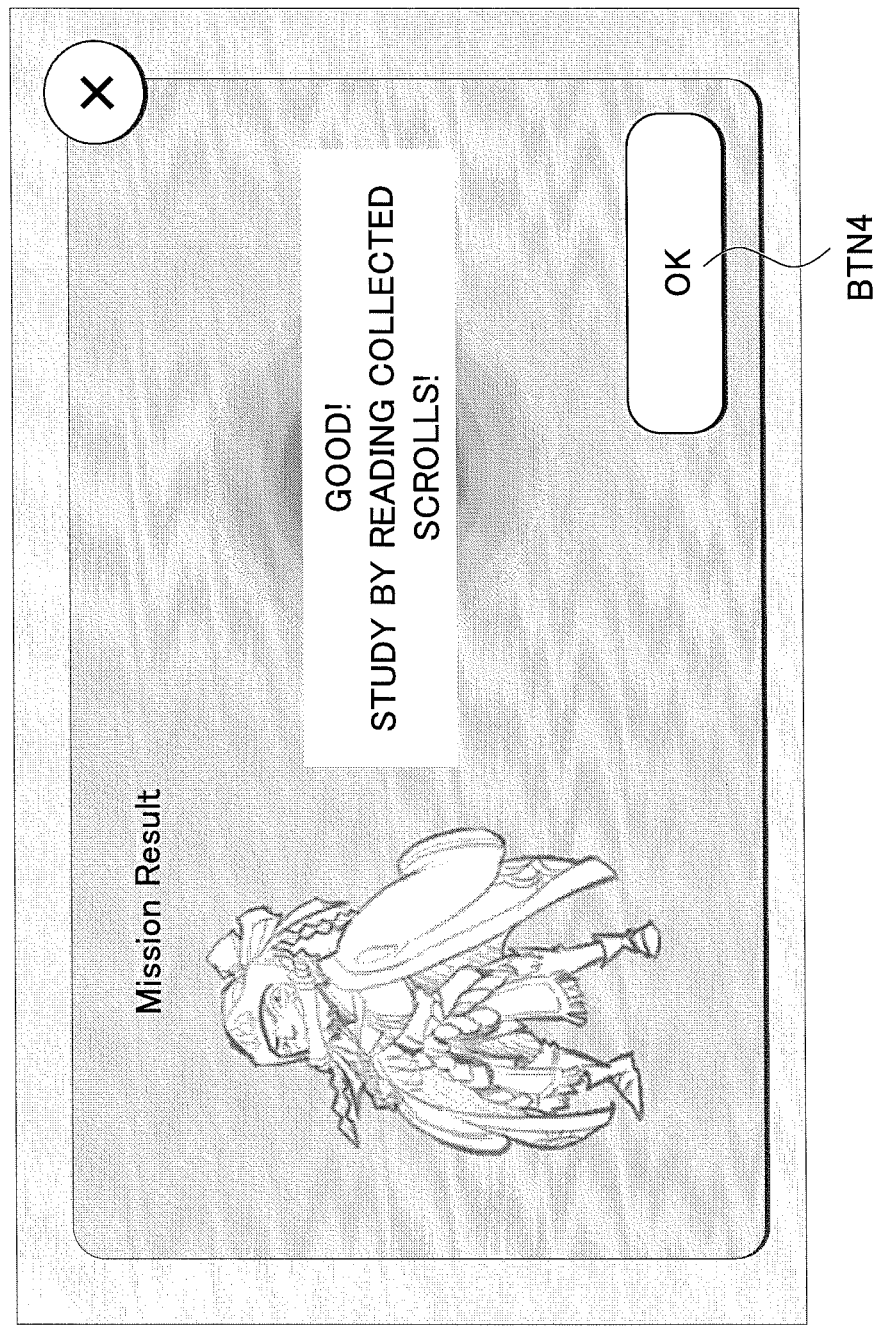
FIG. 12A is a view showing an example of a mission success screen.

When the mission succeeds (YES of step S114), the screen display unit 14 displays a mission success screen under control of the game logic processing unit 12 of the terminal device 1 (step S115). FIG. 12A is a view showing an example of the mission success screen. When the user taps an "OK" button BTN4 as a confirmation, a next screen is displayed.

Figure 12B:
FIG. 12B is a view showing an example of an item get screen.

Referring back to FIG. 10, when the operation of confirmation is accepted by the player operation input unit 11 (step S116), the screen display unit 14 displays an item get screen under control of the game logic processing unit 12 (step S117). FIG. 12B is a view showing an example of the item get screen. When the player taps a "Next" button BTN5 as a confirmation, a next screen is displayed.

Referring back to FIG. 10, when the operation of confirmation is accepted by the player operation input unit 11 (step S118), the series of processes to give the item is finished.

Figure 13:
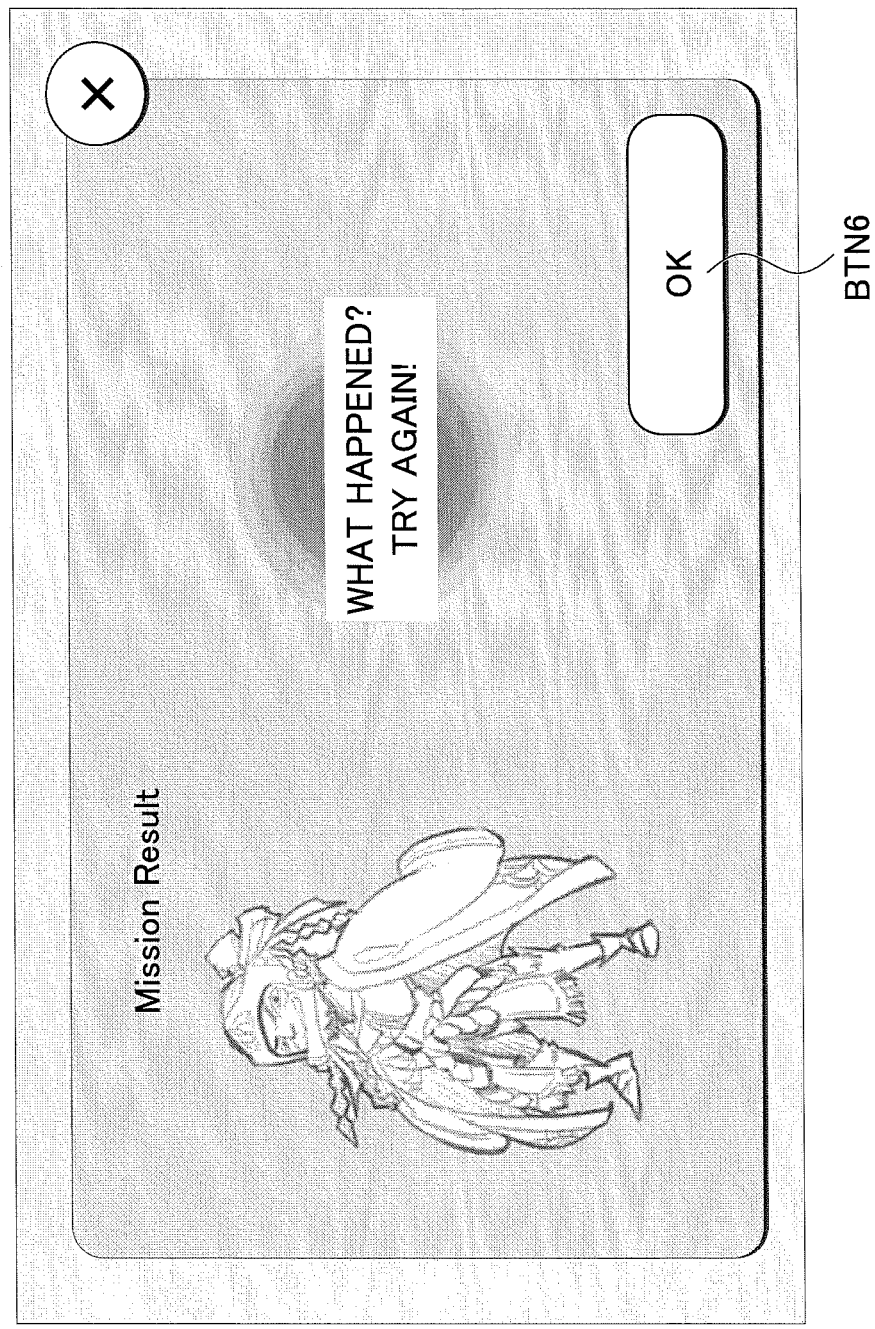
FIG. 13 is a view showing an example of a mission failure screen.

When the mission does not succeed (NO of step S114), the screen display unit 14 displays a mission failure screen under control of the game logic processing unit 12 of the terminal device 1 (step S119). FIG. 13 is a view showing an example of the mission failure screen. When the player taps an "OK" button BTN6 as a confirmation, a next screen is displayed.

Referring back to FIG. 10, when the operation of confirmation is accepted by the player operation input unit 11 (step S120), the series of processes is finished.

Here, when the player collects (obtains) a predetermined number (for example, 5) of different kinds of items (scrolls), and performs a predetermined operation (read a predetermined amount of the scroll and press a comprehended button or the like), the player is further given a reward (accessory or the like). At this time, the player can collect the items by the items being given by the other players, in addition to obtaining by himself/herself.

FIG. 14 is a flowchart showing an operation when the player sends an item to a friend player.

Figure 15A:
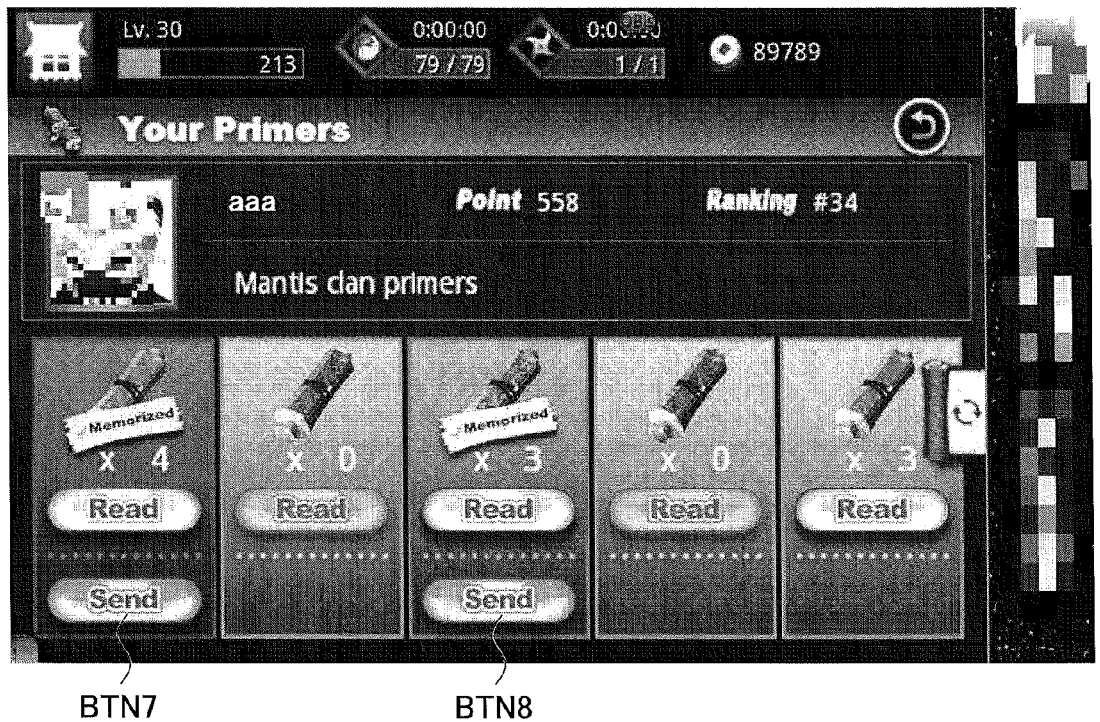
FIG. 15A is a view showing an example of an item selection screen.

In FIG. 14, the screen display unit 14 displays an item selection screen under control of the game logic processing unit 12 (step S121). FIG. 15A shows an example of the item selection screen. In the item selection screen shown in FIG. 15A, the obtained scrolls are displayed at the lower part and "Send" buttons BTN7 and BTN8 are displayed for the read scrolls, respectively. When the player taps (touches) either of the buttons, the item to send to a friend player is selected.

Figure 15B:
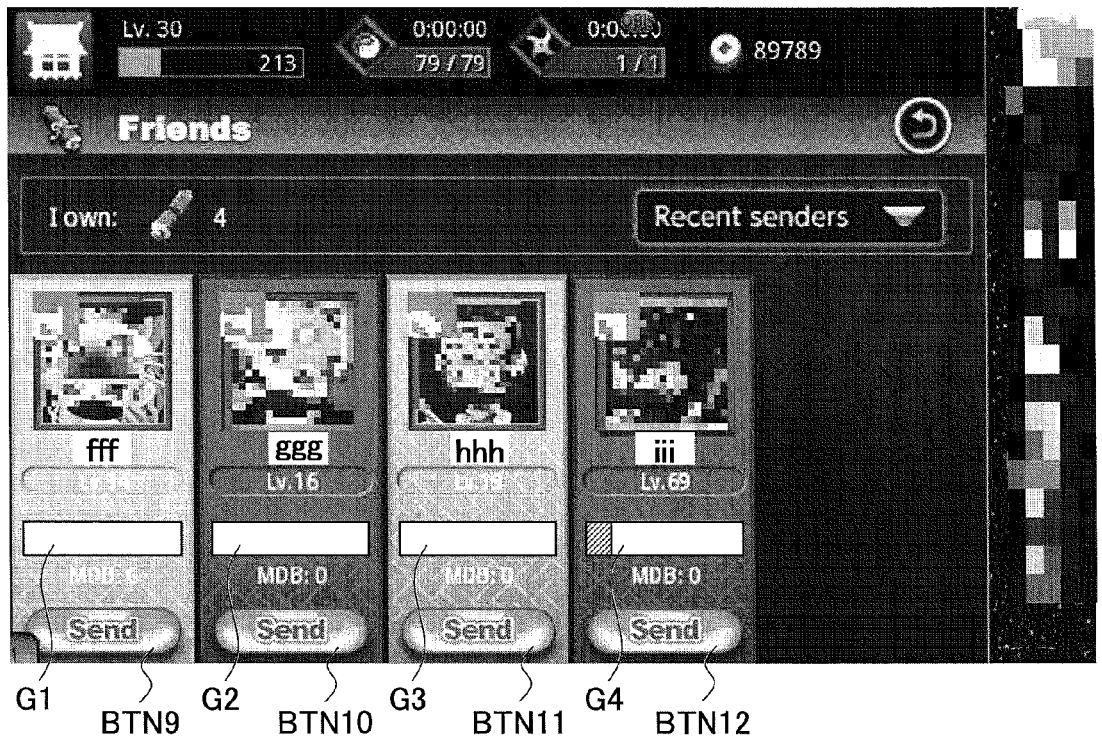
FIG. 15B is a view showing an example of a friend player selection screen.

Referring back to FIG. 14, when the player operation input unit 11 accepts the operation of selecting the item (step S122), the screen display unit 14 displays a friend player selection screen under control of the game logic processing unit 12 (step S123). FIG. 15B shows an example of the friend player selection screen. In the friend player selection screen shown in FIG. 15B, the friend players are displayed at the lower part and "Send" buttons BTN9 to BTN12 are displayed for the players, respectively. When the player taps one of the buttons, the player can select a friend player to whom the item is sent. Here, it is configured that when sending the scroll, the player can add a message.

Further, in this embodiment, gauges (bar diagrams) G1 to G4 are provided for the players "fff", "ggg", "hhh", and "iii", respectively in the friend player selection screen. In each of the gauges G1 to G4, a band with a length in accordance with the value of the bonding parameter indicating the intimacy of the player to the respective friend player is shown from the left end, and a band with a length in accordance with the value of the bonding parameter indicating the intimacy of the respective friend player to the player is shown from the right end. When the "two-way intimacy" is established, the bands extend to the center so that the bands are connected at the center. The gauges may not be straight lines but may be curved lines or the like. Further, instead of the gauge, a circle graph or a doughnut graph may be used.

Referring back to FIG. 14, when the operation of selection of the friend player is accepted by the player operation input unit 11 (step S124), the server accessing unit 13 sends an instruction to send the item to the selected friend player, to the social game processing server apparatus 4 under control of the game logic processing unit 12. The request processing unit 41 of the social game processing server apparatus 4 updates the number of obtained items of the player information (reduces the number of items of the player who has sent the item, and increases the number of items of the player to whom the item is sent) (step S125).

Then, the request processing unit 41 updates the bonding parameter data of the player information (step S126). At this time, for example, when the normal scroll is sent, the bonding parameter from the player who has sent the item to the player to whom the item is sent is increased for 1 point, and when the rare scroll is sent, the bonding parameter from the player who has sent the item to the player to whom the item is sent is increased for 3 points.

Then, the request processing unit 41 determines whether one or both of the bonding parameters for the player who has sent the item and the player to whom the item is sent reach the predetermined value (for example, 100) (step S127). When one of the bonding parameters reaches the predetermined value (one-way of step S127), the request processing unit 41 sets letter data indicating that a "one-way intimacy" is established in the player information of both of the players (step S128).

When both of the bonding parameters reach the predetermined value (two-way in step S127), the request processing unit 41 sets letter data indicating that the "two-way intimacy" is established in the player information of both of the players (step S129).

Figure 16:
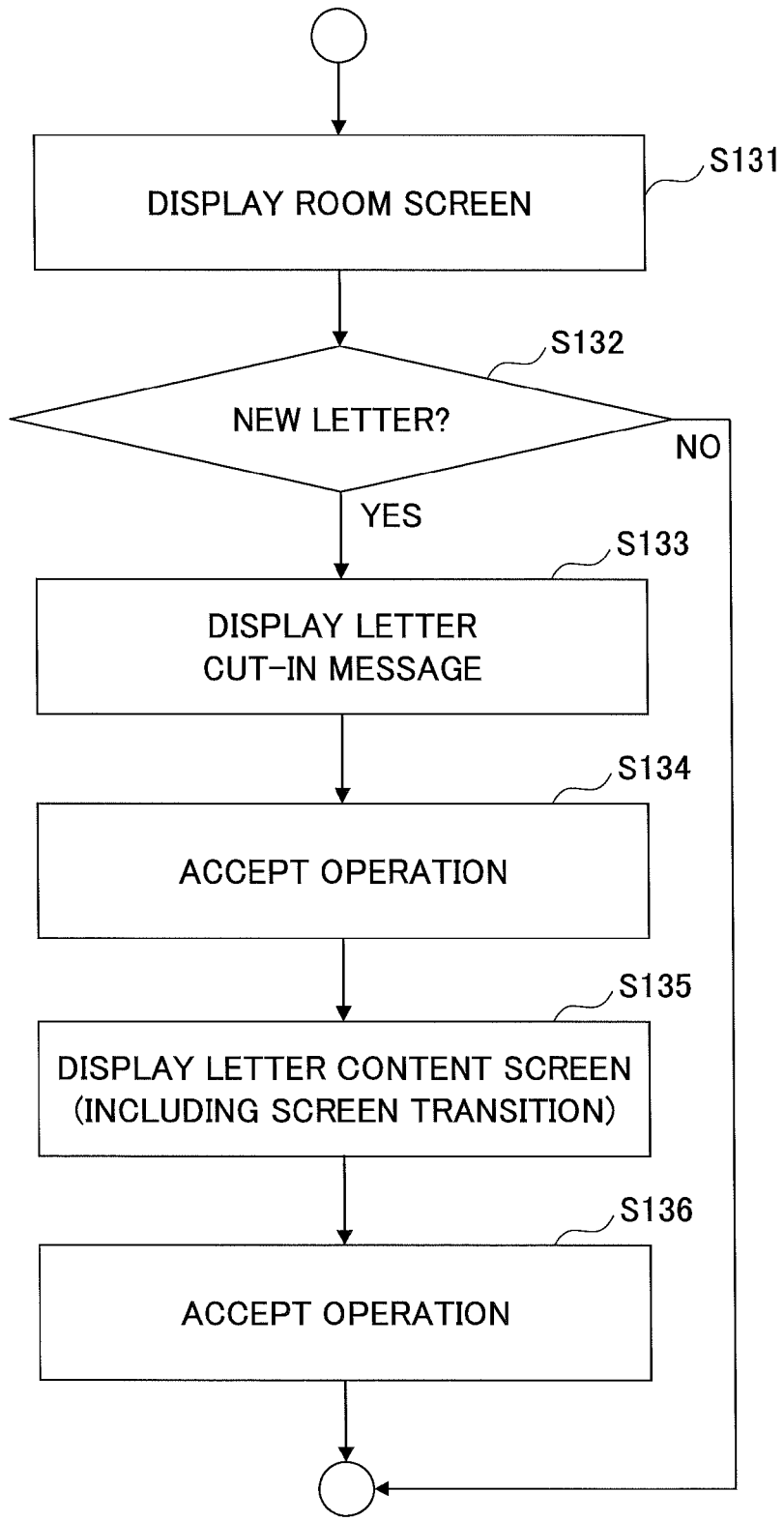
FIG. 16 is a flowchart showing an operation of the embodiment.

FIG. 16 is a flowchart showing an operation when a player room screen is displayed or when the room screen is updated.

Figure 17A:
FIG. 17A and FIG. 17B are views showing an example of a room screen.

In FIG. 16, the screen display unit 14 displays the room screen under control of the game logic processing unit 12 (step S131). FIG. 17A is a view showing an example of the room screen.

Referring back to FIG. 16, prior to displaying the room screen, the game logic processing unit 12 determines whether a new letter for the player exists based on the letter data obtained from the social game processing server apparatus 4 (step S132). When a new letter exists (YES of step S132), the screen display unit 14 displays a letter cut-in message (step S133).

Figure 17B:

FIG. 17B is a view showing an example of the room screen in which the letter cut-in message is displayed. At this time, an animation in which a white pigeon delivers a letter is played and a status indicating a letter is received is displayed for a letter button BTN13 at a lower part of the screen.

Figure 18:
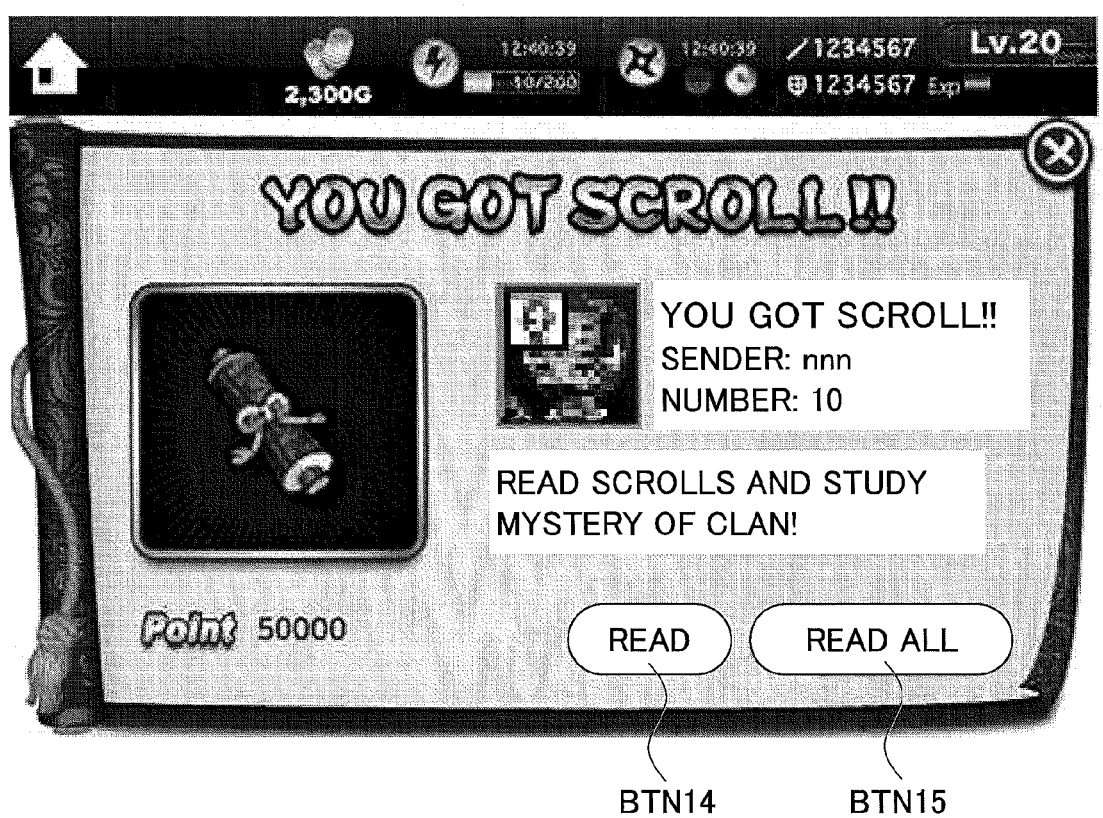
FIG. 18 is a view showing an example of a letter content screen.

Referring back to FIG. 16, when an operation of reading the letter is accepted by the player operation input unit 11 (step S134), the screen display unit 14 displays a letter content screen under control of the game logic processing unit 12 (step S135). FIG. 18 is a view showing an example of the letter content screen in which a message indicating that a scroll is sent (as a gift), a "read" button BTN14 and a "read all" button BTN15 are shown. When the player taps either the "read" button BTN14 or the "read all" button BTN15, the player can read the scroll.

Figure 19A:
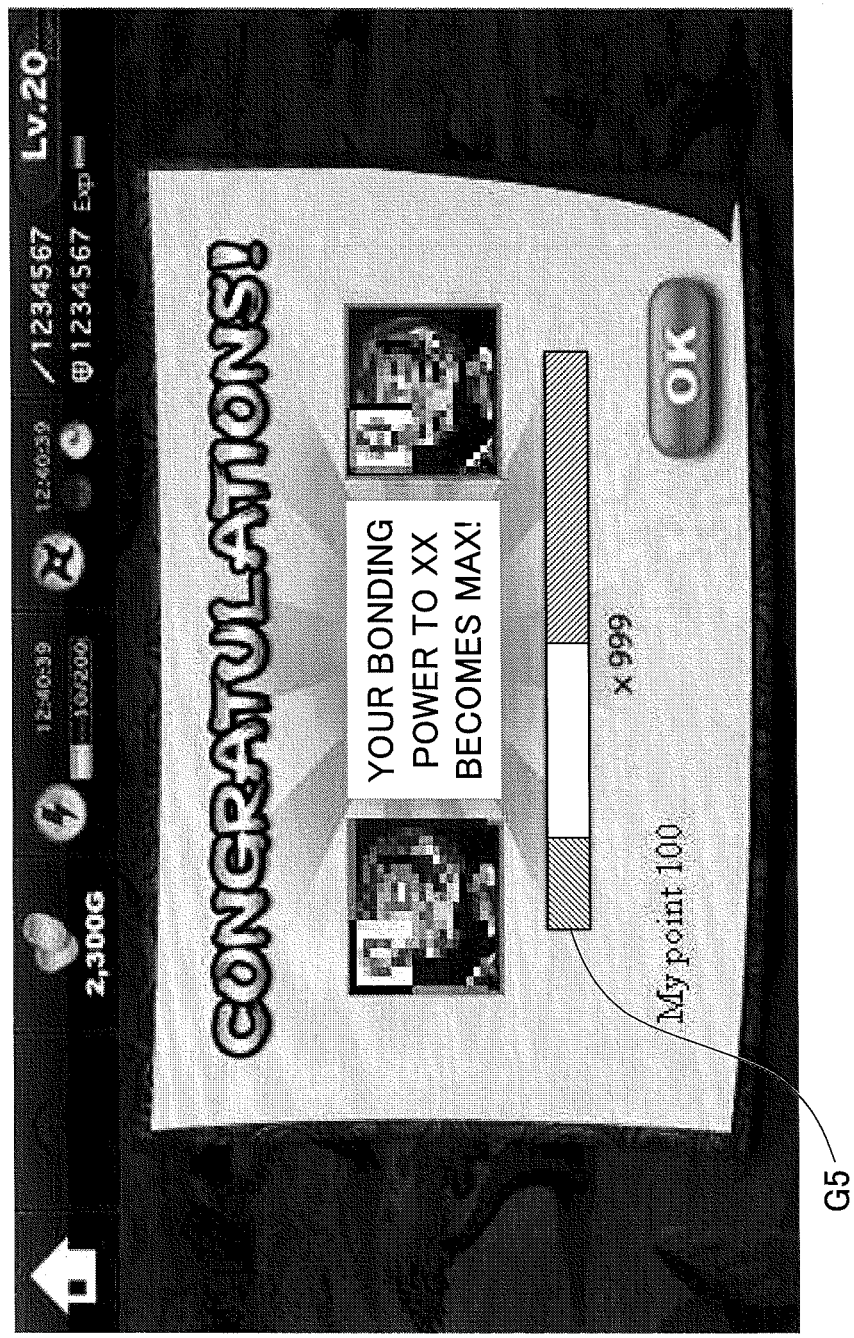
FIG. 19A is a view showing an example of a screen showing that "one-way intimacy" is established.
Figure 19B:
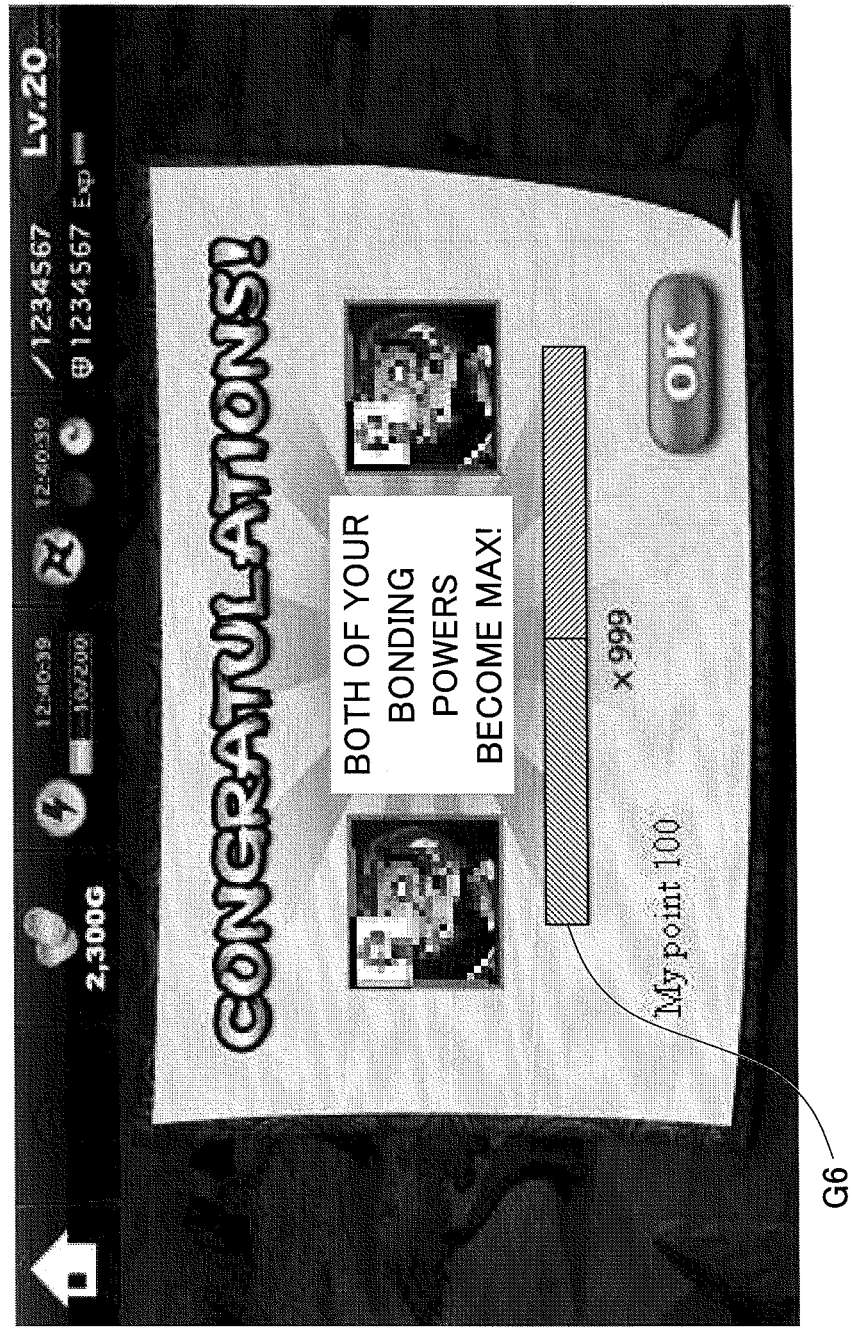
FIG. 19B is a view showing an example of a screen showing that "two-way intimacy" is established.

Further, subsequently after the letter content screen shown in FIG. 18 is displayed, a screen shown in FIG. 19A is displayed when the one-way intimacy is established, and a screen shown in FIG. 19B is displayed when the two-way intimacy is established. In both cases, a band with a length in accordance with the value of the bonding parameter indicating the intimacy of the player toward the respective friend player is shown from the left end, and a band with a length in accordance with the value of the bonding parameter indicating the intimacy of the respective friend player toward the player is shown from the right end. When the one-way intimacy is established, the respective band extends to the center, and when the "two-way intimacy" is established, both bands are connected at the center. The gauges may not be straight lines but may be curved lines or the like. Further, instead of the gauge, a circle graph or a doughnut graph may be used.

Figure 20:
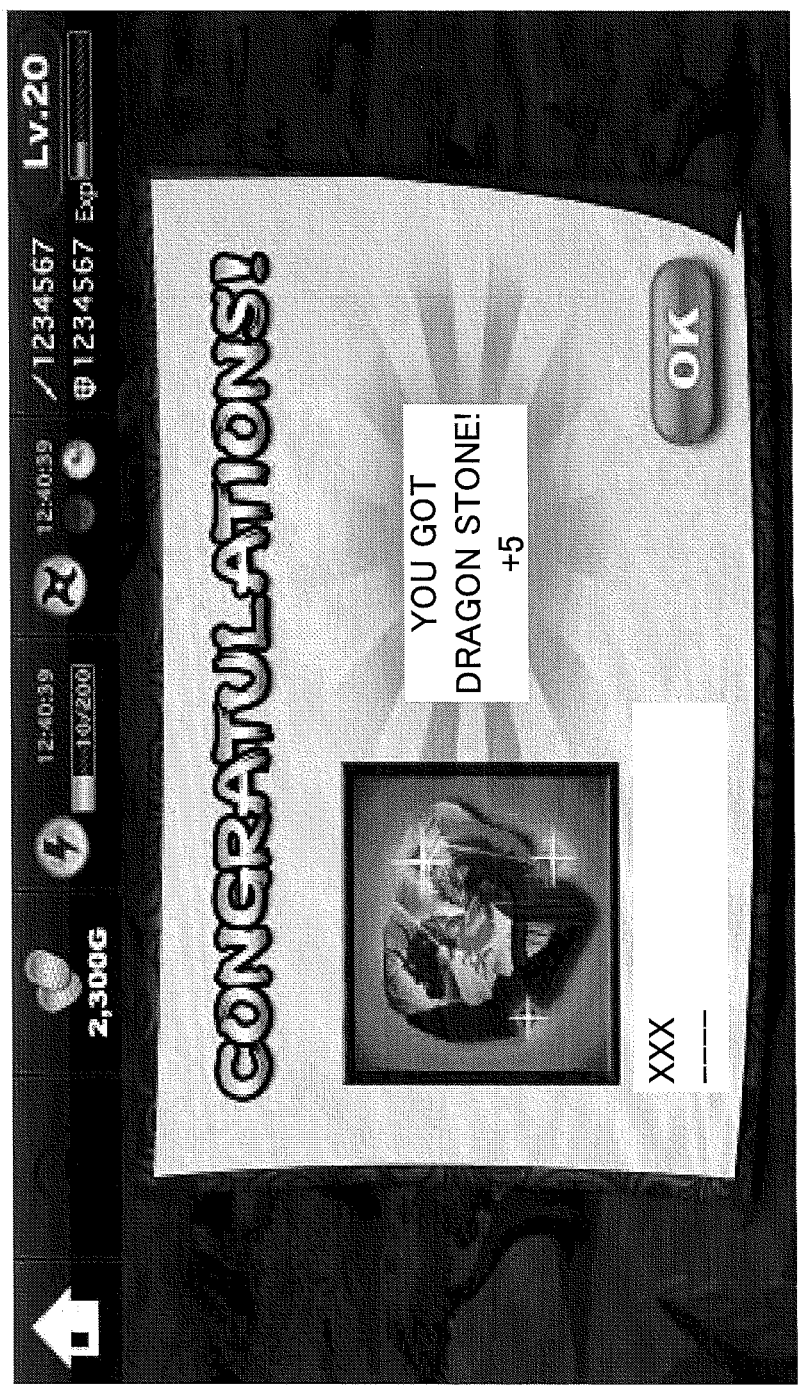
FIG. 20 is a view showing an example of a reward get screen.

Further, subsequently after the screen shown in FIG. 19A or FIG. 19B is displayed, a reward get screen shown in FIG. 20 is displayed. It may be set that a more valuable reward is given when the two-way intimacy is established compared with a case when the one-way intimacy is established.

Referring back to FIG. 16, when the operation of the player in which the letter is read is accepted by the player operation input unit 11 (step S136), the series of the processes is finished.

As described above, according to the embodiment, the following advantages can be obtained.

(1) As the player can see the intimacies between the friend players which are calculated based on the past communications in each of which the respective friend player has given the item, when selecting a friend player to send an item to, it is easy for the player to recognize the friend player who has contributed to the collection of the player's items. Thus, the player can give the item to the friend player who has contributed to the collection of the player's items.

(2) As a notice is displayed or a reward is given when the one-way intimacy or the two-way intimacy is established, the communications between players in which the players send items to each other can be promoted.

According to the game processing server apparatus, the intimacies between the players are managed by the bonding parameters in accordance with the items sent or received between the players, and the statuses are appropriately displayed. Thus, the communications between players in which the players send items to each other, the players cooperate with each other, and the players have deep friendships with each other can be promoted to increase motivation to play the game.

Although a preferred embodiment of the game processing server apparatus and the terminal device has been specifically illustrated and described, it is to be understood that minor modifications may be made therein without departing from the spirit and scope of the invention as defined by the claims.

The individual constituents of the game processing server apparatus 4 and the terminal device 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

The present invention is not limited to the specifically disclosed embodiments, and variations and modifications may be made without departing from the scope of the present invention.

The present application is based on Japanese Priority Application No. 2012-103454 filed on Apr. 27, 2012, the entire contents of which are hereby incorporated by reference.

What is claimed is:

1. A game processing server apparatus connected to a terminal device via a network and controlling a game in which a reward is given by completing a collection of predetermined items, comprising:
 a parameter updating unit which receives an instruction to send an item from a first player to a second player, and calculates and updates a bonding parameter indicating intimacy from the first player toward the second player; and
 a display unit which displays in a screen for a target player a value of a first bonding parameter indicating intimacy from the target player toward another player and a value of a second bonding parameter indicating intimacy from the other player toward the target player.

2. The game processing server apparatus according to claim 1, further comprising:
 a reward management unit which gives a reward to the players when one of the values of the first bonding parameter and the second bonding parameter reaches a predetermined value, and gives a reward to the players when the values of both the first bonding parameter and the second bonding parameter reach a predetermined value.

3. The game processing server apparatus according to claim 1,
 wherein the value of the first bonding parameter and the value of the second bonding parameter are expressed by the lengths in a gauge or the areas in a graph so that the ends become closer by the increase of the value of the first bonding parameter or the value of the second bonding parameter and the ends are connected when both the value of the first bonding parameter and the value of the second bonding parameter reach a predetermined value.

4. A non-transitory computer-readable recording medium having recorded thereon a program that causes a computer, which composes a game processing server apparatus connected to a terminal device via a network and controlling a game in which a reward is given by completing a collection of predetermined items, to execute a method comprising:
 receiving an instruction to send an item from a first player to a second player, and calculating and updating a bonding parameter indicating intimacy from the first player toward the second player; and
 displaying in a screen for a target player a value of a first bonding parameter indicating intimacy from the target player toward another player and a value of a second bonding parameter indicating intimacy from the other player toward the target player.

5. A non-transitory computer-readable recording medium having recorded thereon a program that causes a computer, which composes a terminal device connected to a game processing server apparatus controlling a game in which a reward is given by completing a collection of predetermined items via a network, to execute a method comprising:
 sending an instruction to send an item from a first player to a second player to the game processing server apparatus to activate a function of the game processing server apparatus to calculate and update a bonding parameter indicating intimacy from the first player toward the second player; and
 obtaining information about the bonding parameter from the game processing server apparatus, and displaying in a screen for a target player a first bonding parameter indicating intimacy from the target player to another player and a value of a second bonding parameter indicating intimacy from the other player toward the target player.

* * * * *